(12) United States Patent  
Kurup et al.

(10) Patent No.: US 11,729,179 B2
(45) Date of Patent: *Aug. 15, 2023

(54) SYSTEMS AND METHODS FOR DATA DRIVEN INFRASTRUCTURE ACCESS CONTROL

(71) Applicant: JPMORGAN CHASE BANK, N.A., New York, NY (US)

(72) Inventors: Rejith G. Kurup, Morganville, NJ (US); Kanishka Hettiarachchi, Chatham, NJ (US); Vladimir Belinkis, Freehold, NJ (US); Ish K. Ahluwalia, East Brunswick, NJ (US); Ricky Hei Wong Chan, Woodside, NY (US); Dennis Joseph, San Jose, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 17/202,031

(22) Filed: Mar. 15, 2021

(65) Prior Publication Data

US 2021/0203663 A1 Jul. 1, 2021

Related U.S. Application Data

(63) Continuation of application No. 16/220,784, filed on Dec. 14, 2018, now Pat. No. 10,951,624.

(51) Int. Cl.
*G06F 21/62* (2013.01)
*H04L 9/40* (2022.01)
(Continued)

(52) U.S. Cl.
CPC ............ *H04L 63/102* (2013.01); *G06F 21/31* (2013.01); *G06F 21/604* (2013.01);
(Continued)

(58) Field of Classification Search
CPC ..... H04L 63/102; H04L 67/535; H04L 12/66; H04L 63/20; H04L 63/10; H04L 63/101;
(Continued)

(56) References Cited

U.S. PATENT DOCUMENTS

2015/0026208 A1* 1/2015 Kuhmuench ......... G06F 21/629
707/769
2015/0180872 A1* 6/2015 Christner ................ H04L 63/10
726/4

(Continued)

*Primary Examiner* — Malcolm Cribbs
(74) *Attorney, Agent, or Firm* — Greenberg Traurig LLP

(57) ABSTRACT

In one embodiment, in access gateway comprising at least one computer processor, a method for real-time data protection may include: (1) receiving a user login comprising a user identifier; (2) retrieving, using an in-memory entitlements graph, a role definition for the user identifier, wherein the role definition comprises allowed actions, entitled assets, and a system account; (3) receiving a selection of a requested asset from the entitled assets and a requested action from the allowed actions; (4) verifying the user's entitlement to access the requested asset and perform the requested action with the system account using the in-memory entitlement graph based on the user identifier, the system account, the requested asset, and the requested action; and (5) authorizing the user's entitlement to access the requested asset and perform the requested action with the system account substantially at a time of requested access.

20 Claims, 4 Drawing Sheets

(51) Int. Cl.
- *G06F 21/60* (2013.01)
- *G06F 21/31* (2013.01)
- *H04L 12/66* (2006.01)
- *H04L 67/50* (2022.01)

(52) U.S. Cl.
CPC .......... *G06F 21/6218* (2013.01); *H04L 12/66* (2013.01); *H04L 63/20* (2013.01); *H04L 67/535* (2022.05); *G06F 2221/2137* (2013.01); *G06F 2221/2141* (2013.01)

(58) Field of Classification Search
CPC ..... H04L 63/105; G06F 21/31; G06F 21/604; G06F 21/6218; G06F 2221/2137; G06F 2221/2141; G06F 21/60; G06F 21/62; G06F 21/6209; G06F 21/6245
See application file for complete search history.

(56) References Cited

U.S. PATENT DOCUMENTS

| | | | |
|---|---|---|---|
| 2015/0200966 A1* | 7/2015 | Kasturirangan | H04L 63/10 726/4 |
| 2020/0169565 A1* | 5/2020 | Badawy | G06F 21/552 |

\* cited by examiner

SYSTEMS AND METHODS FOR DATA DRIVEN INFRASTRUCTURE ACCESS CONTROL

This application is a Continuation of U.S. patent application Ser. No. 16/220,784, filed Dec. 14, 2018, now U.S. Pat. No. 10,951,624, the disclosure of which is hereby incorporated by reference in its entirety.

BACKGROUND OF THE INVENTION

1. Field of the Invention

The present disclosure generally relates to systems and methods for data driven access infrastructure control.

2. Description of the Related Art

Traditionally, User ID's and passwords have been used to prevent unauthorized access to systems and/or sensitive data. Although improvements have been made over the years, such as the enforcement of password complexity rules, change intervals, vaulting, and various levels of encryption, the ever-evolving cyber threat landscape and the fundamental risk of having, transmitting and using passwords creates an operational risk and vulnerability that continues to be exploited to this day.

Compounding this risk are not only the disparate number of password stores and the number of places that require the use of passwords for protecting from unauthorized access, but the number of systems that can be accessed using compromised credentials. This is especially true for highly-privileged accounts, such as root and other system accounts that by their nature, not only have full access to individual hosts, but broad access to large numbers of servers across the environment.

Finally, inadequate monitoring of account activity often leads to prolonged use of compromised credentials for extended periods of time which significantly increases the potential damage that can be done.

SUMMARY OF THE INVENTION

Systems and methods for data driven infrastructure access control are disclosed. In one embodiment, in access gateway comprising at least one computer processor, a method for real-time data protection may include: (1) receiving a user login comprising a user identifier; (2) retrieving, using an in-memory entitlements graph, a role definition for the user identifier, wherein the role definition comprises allowed actions, entitled assets, and a system account; (3) receiving a selection of a requested asset from the entitled assets and a requested action from the allowed actions; (4) verifying the user's entitlement to access the requested asset and perform the requested action with the system account using the in-memory entitlement graph based on the user identifier, the system account, the requested asset, and the requested action; and (5) authorizing the user's entitlement to access the requested asset and perform the requested action with the system account substantially at a time of requested access.

In one embodiment, the method may further include performing a step-up validation against a regulation, policy, or law.

In one embodiment, the in-memory entitlements graph may be based on linking common information from human resources data, entitlement data, and policy data.

In one embodiment, the method may further include establishing a session with the requested resource; and logging user actions during the session.

In one embodiment, the user identifier may include a UserId.

In one embodiment, the access gateway may authenticate the user.

In one embodiment, the asset may include a database instance or an application instance.

In one embodiment, the asset may include a business flow or a data object.

In one embodiment, the user's entitlement to access the requested asset and perform the requested action with the system account substantially at the time of requested access is authorized with the in-memory entitlement graph.

In one embodiment, the method may include updating the in-memory entitlement graph.

According to another embodiment, a s system for real-time data protection may include an access gateway comprising at least one computer processor and executing a gateway computer program; a user access device; a plurality of assets; and an in-memory entitlement graph. In one embodiment, the gateway computer program may receive a user login comprising a user identifier from the user access device; may retrieve a role definition for the user identifier from the in-memory entitlement graph, wherein the role definition comprises allowed actions, entitled assets, and a system account; may receive a selection of a requested asset from the entitled assets and a requested action from the allowed actions from the user access device; may verify the user's entitlement with the in-memory entitlement graph based on the user identifier, the system account, the requested asset, and the requested action; and may authorize the user's entitlement to access the requested asset and perform the requested action with the system account substantially at a time of requested access.

In one embodiment, the gateway computer program may perform a step-up validation against a regulation, policy, or law.

In one embodiment, the in-memory entitlements graph may be based on linking common information from human resources data, entitlement data, and policy data In one embodiment, the access gateway may establish a session with the requested resource and logs user actions during the session.

In one embodiment, the user identifier may include a UserId.

In one embodiment, the access gateway may authenticate the user.

In one embodiment, the asset may include a database instance or an application instance.

In one embodiment, the asset may include a business flow or a data object.

In one embodiment, wherein the user's entitlement to access the requested asset and perform the requested action with the system account substantially at the time of requested access is authorized with the in-memory entitlement graph.

In one embodiment, the in-memory entitlement graph may be updated.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for data driven infrastructure access control. Embodiments may leverage a data driven approach to solving the extreme scaling limitations of traditional technology access management systems.

Embodiments may provide some or all of the following: (1) big data graph-based data store to derive "wisdom" or the most agile true state of the run time systems and organization's role structure; (2) flexible policy language rules interface that allows real time integration with change management authorization data before granting access to run time systems in a "Just in time" fashion; (3) post access analysis on full session data based on systematic machine learned review that may be leveraged for anomaly detection among peers in a group; and (4) leverage machine learned analysis to identify repetitive tasks, ripe for automation.

In embodiments, a highly performant and agile decision graph based in memory big data system may address the latencies/data warehousing delays associated with a traditional relational database backend systems, allowing the near real time ability to re-visualize how we should understand relationships between role, identity and actions that should be exposed to the system end users.

In addition, embodiments may provide policy management teams the ability to continuously fine tune the rulesets on how access should be granted to run time systems without having to wait for an adjustment of new access request to take effect. This may result in continuous close alignment of desired runtime access to users in the organization without having to wait for roles and system access requests to be processed and addresses the limitation of RBAC in extreme scale situations.

Figure 1:
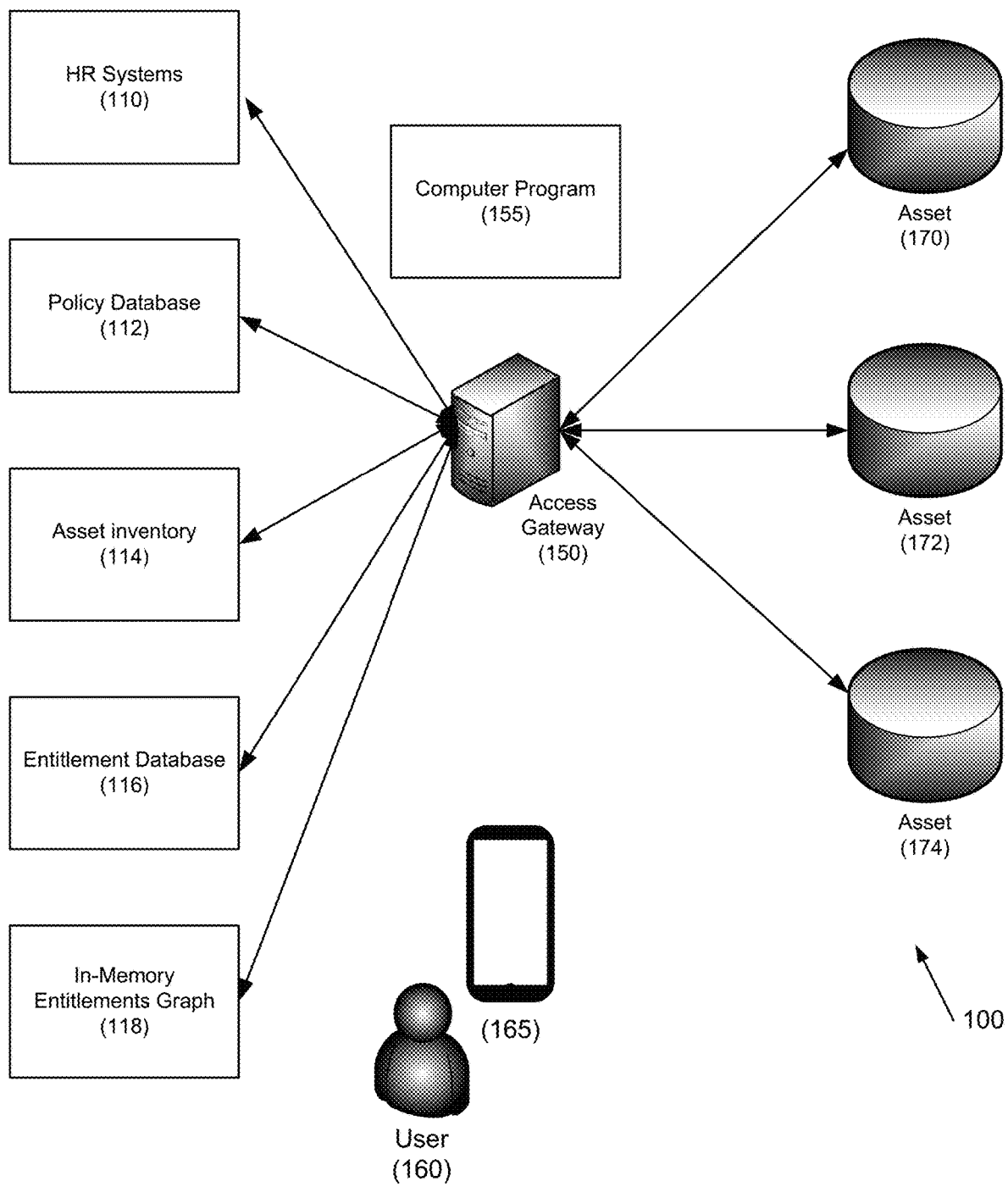
FIG. 1 depicts a system for data driven infrastructure access control according to one embodiment.

Referring to FIG. 1, a system for data driven infrastructure access control is provided according to one embodiment. System 100 may include access gateway 150, which may be executed by any suitable electronic device, such as a server. Access gateway 150 may execute gateway computer program or application 155 that may provide data driven infrastructure access control.

In one embodiment, gateway computer program 155 may be a privilege access management application.

Gateway computer program 155 may communicate with HR systems 110, policy database 112, asset inventory 114, entitlement database 116, and in-memory entitlements graph 118. HR systems 110 may provide information on an organization's employees, such as employee names, identifiers, title, role, role definition, office location(s), etc. Policy database 112 may provide policy information for an organization, a business unit, a group of users, a role, etc., as well as applicable laws and regulations. Asset inventory 114 may provide information on an organization's hardware, computer programs and applications, operating systems, data, etc. In one embodiment, asset inventory 114 may further include information on the organization's physical areas, such as areas that may have restricted access. In one embodiment, asset inventory 114 may include regulatory controls classifications such as SOC1, SoX, Sensitivity of the run time environment such as Production or User Acceptance Testing environments, Privacy requirements of data such as PII or HIPAA, etc.

Entitlement database 116 may provide an identification of asset entitlements to which users, groups of users, roles, etc. within an organization (e.g., assets 170, 172, 174) may have permission to access.

In-memory entitlements graph 118 may provide a real-time entitlement checks, and may provide "just in time" validation of organizational changes and incident management controls. For example, in-memory entitlements graph 118 may include an abstraction layer and repository for privileged infrastructure access entitlements. In-memory entitlements graph 118 may integrate with reference data systems, such as asset inventory 114, entitlements database 116, etc. to source entitlements reference data. It may also integrate with access provisioning systems for provisioning end-user privileges.

In one embodiment, in-memory entitlements graph 118 may be hosted by a server, a collection of servers, in the cloud, etc. In one embodiment, in-memory entitlements graph 118 may be accessed by an API call.

Assets 170, 172, 174 may be any sort of assets for an organization. Assets 170, 172, 174 may be internal assets, cloud-based assets, or hybrid assets. Assets 170, 172, 174 may be hardware, software, systems, areas, data, etc. Examples include database instances, application instances, business flows, data objects, configuration blueprints, automation system assets/configuration items, abstracted entity types (e.g., an OS provisioning system's "node types"), etc.

It should be noted that although only three assets 170, 172, 174 have been illustrated, a fewer or greater number of assets may be provided as is necessary and/or desired.

User 160 may request to access any of assets 170, 172, 174 using user electronic device 165. User electronic device 165 may be any suitable electronic device including, for example, workstations, notebook computers, tablet computers, desktop computers, smart phones, smart watches, Internet of Things (IoT) appliances, etc.

Figure 2:
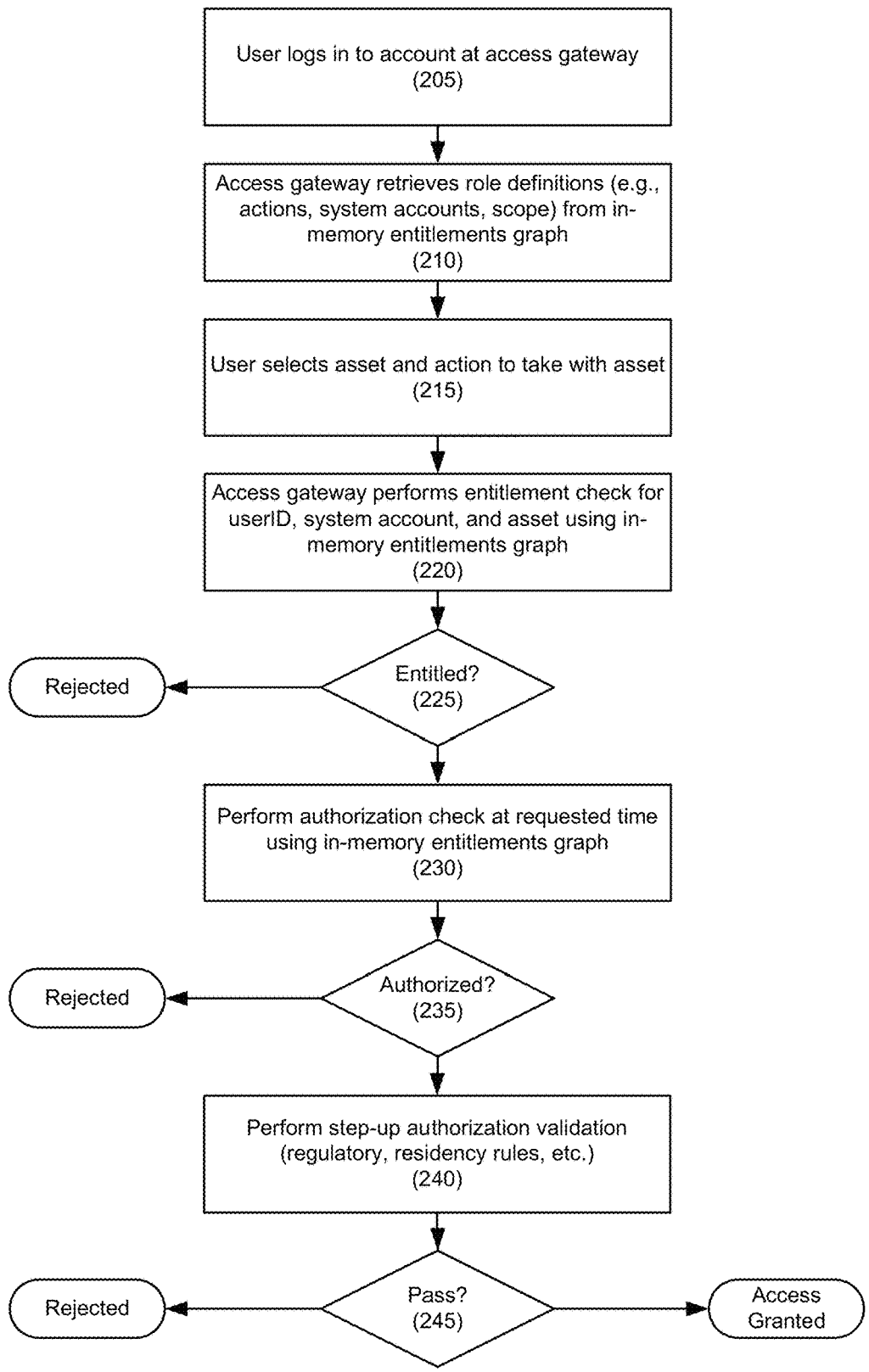
FIG. 2 depicts a method for data driven infrastructure access control according to one embodiment.

Referring to FIG. 2, a method for data driven infrastructure access control is provided according to one embodiment. In one embodiment, In step 205, a user using an electronic device (e.g., a workstation, a notebook computer, a tablet computer, a desktop computer, a smart phone, a smart watch, an Internet of Things (IoT) appliance, etc. may log in to an account at an access gateway. In one embodiment, the user may log in to an account using any suitable method (e.g., UserID and password, RSA token, multi-level authentication, biometric authentication, etc.

In step 210, the access gateway, or a computer program executing thereon, may retrieve role definitions for the user based, for example, on the UserID, from an in-memory entitlements graph.

As used herein, a role, such as system administrator, may have a role definition. The role definition may specify attributes of the role, such as actions (e.g., what the role can do), system accounts (e.g., what the actions run as), and scope (e.g., what assets the actions can be performed on). The role may also have members, such as the UserIds that belong to the role (e.g., employees that are system administrators).

Examples of actions include read-write access to an operating system, create access to a configuration blueprint, execute access to a microservice, etc.

Also as used herein, a scope is a collection of assets, such as internal assets, cloud-based assets, hybrid assets, hardware, software, systems, areas, data, database instances, application instances, business flows, data objects, configuration blueprints, automation system assets/configuration items, abstracted entity types (e.g., an OS provisioning system's "node types"), etc.

In one embodiment, the in-memory entitlements graph may periodically be updated to reflect the role definitions, system accounts, and the scopes associated with those role definitions. In one embodiment, the in-memory entitlements graph may include data from human resources databases, policy data, and entitlement databases. Additional data sources may be used as is necessary and/or desired.

In one embodiment, the in-memory entitlements graph may link the data from these sources so that it has current information on UserIDs, roles, role members, role definitions (e.g., actions, system accounts, scope), etc.

Figure 3:
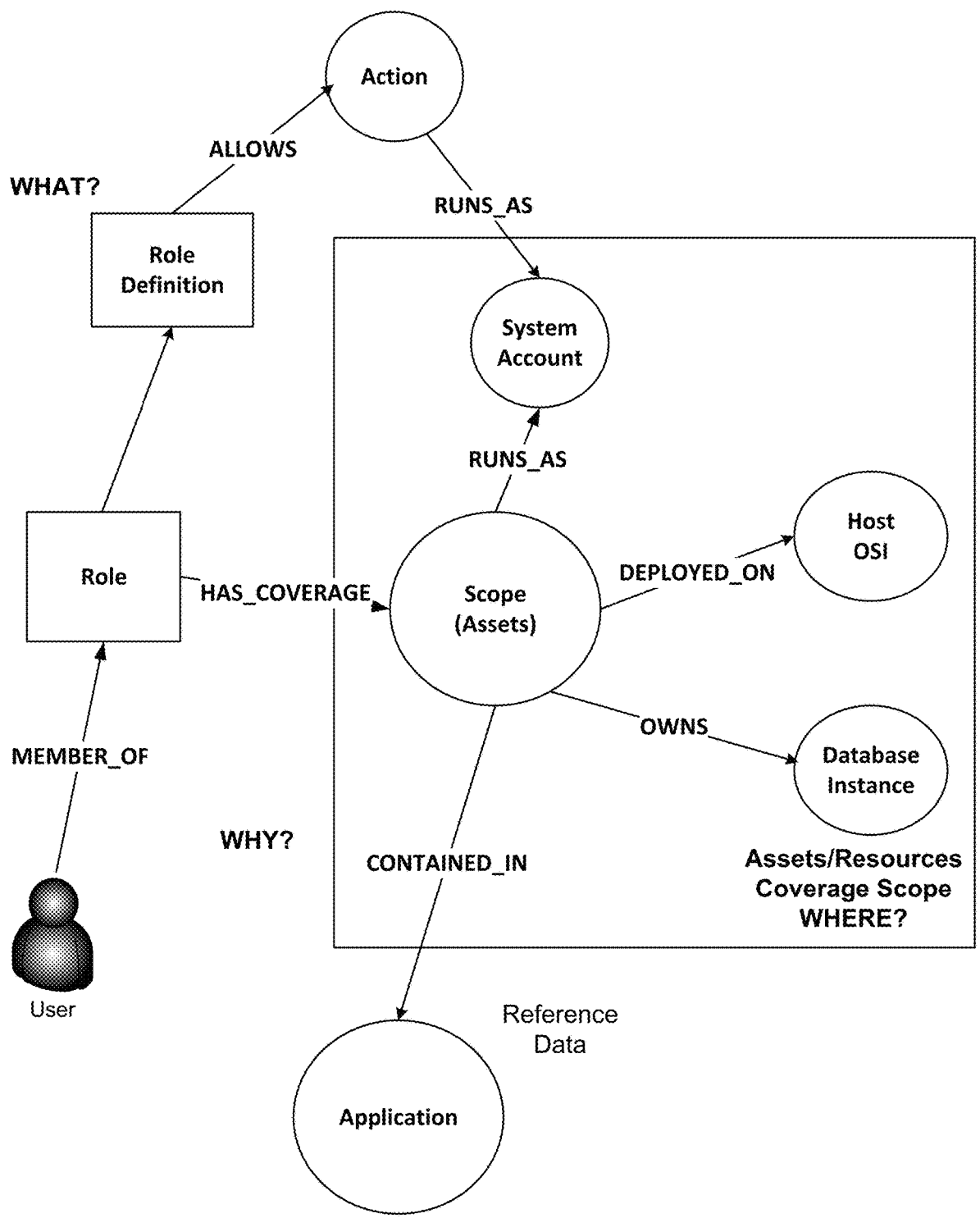
FIG. 3 depicts a method for access request authorization and actioning according to one embodiment.

An simplified illustration of an in-memory entitlements graph is provided in FIG. 3. In one embodiment, the user may be a member of a role, and the role may have a role definition. The role definition may identify allowed actions, a system account for running those actions, and a scope (e.g., assets that the role is entitled to access). For example, the assets may be deployed on a Host operating system instance (OSI), own a database instance, or may be contained in an application.

In one embodiment, the in-memory entitlements graph may be periodically updated with data from, for example, HR systems, asset inventory, and the entitlements database. The update period may vary depending on data source (e.g., HR systems may provide updates daily, asset inventory may be updated hourly, etc.).

In one embodiment, the in-memory entitlements graph may identify the role definitions based on the UserId or similar, and may return the actions, system accounts, and scope to the access gateway or computer program executing thereon.

Figure 4:
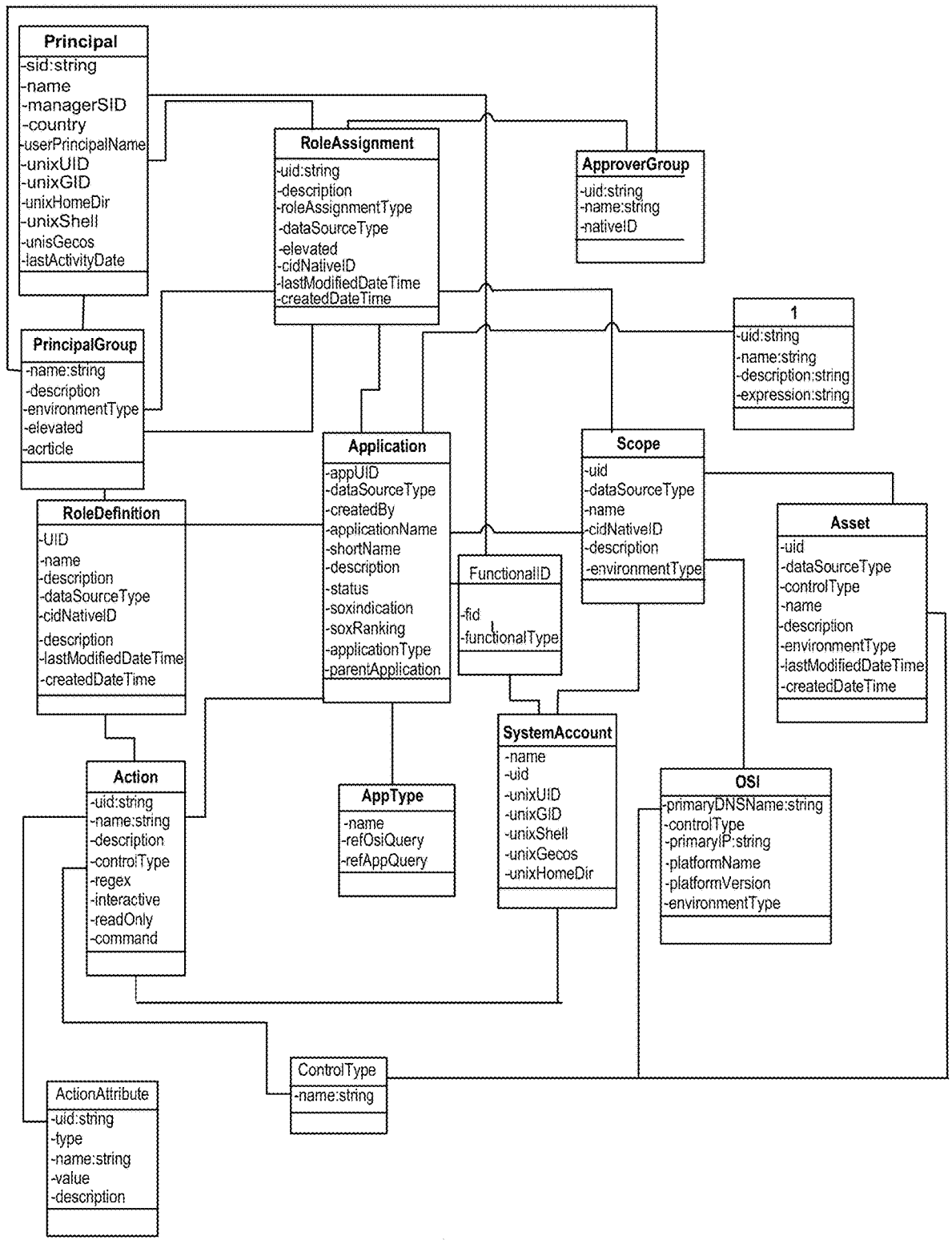
FIG. 4 depicts an exemplary data model for the in-memory entitlements graph according to one embodiment.

An exemplary data model for the in-memory entitlements graph is provided in FIG. 4.

Referring again to FIG. 2, in step 215, the user may select one or more asset (e.g., hardware, software, systems, areas, data, etc.) to access, and an action to take with regard to that asset. In one embodiment, the user may select the asset using, for example, a menu on the computer program or application executed by the access gateway.

For example, the user may select an application, an application instance scope/environment, an asset, and a destination account. In one embodiment, the user may interact with an interactive menu interface to make these selections. For example, based on the retrieved role definition the interactive menu may identify the assets to which the user is entitled, and one or more actions to take with the asset, and the user may select an asset and one or more action.

In step 220, the access gateway, or a computer program executing thereon, may perform an entitlement check for the asset using the in-memory entitlements graph. For example, the access gateway, or computer program executed thereon, may provide the UserID, the system account identified in the role definition, and may determine whether the user is entitled to access the asset and take the specified action.

If, in step 225, the user is not entitled, the access request is rejected. If the user is entitled, the process continues to step 230.

In one embodiment, a work order, ticket, or other record may be generated for the access request.

In step 230, the access gateway, or a computer program executing thereon, may perform an authorization check for the user at the time of access. In one embodiment, the authorization check may determine whether the user is entitled to access the asset and conduct the action just before access is granted. For example, a user may be authorized to an asset during normal business hours. If the request is made outside normal business hours, the authorization check will fail.

In one embodiment, the authorization check may be optional for certain actions. For example, if the action is a "read only" action, the authorization may be skipped.

If, in step 235, the user is not authorized, the access request is rejected. If the user is authorized, the process continues to step 240.

In step 240, the access gateway, or a computer program executing thereon, may perform step-up authorization validation. In one embodiment, the step up authorization validation may check for regulatory issue, residency rules, etc. In one embodiment, internal and external policies, laws, regulations, etc. may be applied against the user information, such as geographic information) to validate the authorization to the asset.

If, in step 245, the validation does not pass, the access request is rejected. If the validation passes, the user may be granted access to the asset. In one embodiment, the access gateway, or a computer program executing thereon, may authorize a session with the asset, and the user's activity with the asset may be logged or may be otherwise monitored.

Although several embodiments are disclosed herein, it should be recognized that they are not exclusive, and elements of one embodiment may be used with other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, secure enclaves on a chip (e.g., Intel SGX/AMD SEP), or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for real-time data protection, comprising:
   in an access gateway comprising at least one computer processor:
   receiving a user login comprising a user identifier;
   retrieving, using an in-memory entitlements graph, a role definition for the user identifier, wherein the role definition comprises allowed actions, entitled assets, and a system account;
   receiving a selection of a requested asset from the entitled assets and a requested action from the allowed actions;
   verifying the user's entitlement to access the requested asset and perform the requested action with the system account using the in-memory entitlement graph based on the user identifier, the system account, the requested asset, and the requested action, wherein the in-memory entitlement graph is periodically updated to reflect role definitions, system accounts and scopes associated with the role definitions; and
   authorizing the user's entitlement to access the requested asset and perform the requested action with the system account substantially at a time of requested access.

2. The method of claim 1, further comprising:
   performing a step-up validation against a regulation, policy, or law.

3. The method of claim 1, wherein the in-memory entitlements graph is based on linking common information from human resources data, entitlement data, and policy data.

4. The method of claim 1, further comprising:
   establishing a session with the requested asset; and
   logging user actions during the session.

5. The method of claim 1, wherein the requested asset comprises a database instance or an application instance.

6. The method of claim 1, wherein the requested asset comprises a business flow or a data object.

7. The method of claim 1, wherein the user's entitlement to access the requested asset and perform the requested action with the system account substantially at the time of requested access is authorized with the in-memory entitlement graph.

8. A system for real-time data protection, comprising:
   an access gateway comprising at least one computer processor and executing a gateway computer program;
   a user access device;
   a plurality of assets; and
   an in-memory entitlement graph;
   wherein:
   the gateway computer program receives a user login comprising a user identifier from the user access device;
   the gateway computer program retrieves a role definition for the user identifier from the in-memory entitlement graph, wherein the role definition comprises allowed actions, entitled assets, and a system;
   the gateway computer program receives a selection of a requested asset from the entitled assets and a requested action from the allowed actions from the user access device;
   the gateway computer program verifies the user's entitlement with the in-memory entitlement graph based on the user identifier, the system account, the requested asset, and the requested action, wherein the in-memory entitlement graph is periodically updated to reflect role definitions, system accounts and scopes associated with the role definitions; and
   the gateway computer program authorizes the user's entitlement to access the requested asset and perform the requested action with the system account substantially at a time of requested access.

9. The system of claim 8, wherein the gateway computer program performs a step-up validation against a regulation, policy, or law.

10. The system of claim 8, wherein the in-memory entitlements graph is based on linking common information from human resources data, entitlement data, and policy data.

11. The system of claim 8, wherein the access gateway establishes a session with the requested asset and logs user actions during the session.

12. The system of claim 8, wherein the requested asset comprises a database instance or an application instance.

13. The system of claim 8, wherein the requested asset comprises a business flow or a data object.

14. The system of claim 8, wherein the user's entitlement to access the requested asset and perform the requested action with the system account substantially at the time of requested access is authorized with the in-memory entitlement graph.

15. A method for real-time data protection, comprising:
- in an access gateway comprising at least one computer processor:
  - receiving a user login comprising a user identifier;
  - retrieving, using an in-memory entitlements graph, a role definition for the user identifier, wherein the role definition comprises allowed actions, entitled assets, and a system account, wherein the in-memory entitlement graph is periodically updated with data during an update period that varies based on the data source;
  - receiving a selection of a requested asset from the entitled assets and a requested action from the allowed actions;
  - verifying the user's entitlement to access the requested asset and perform the requested action with the system account using the in-memory entitlement graph based on the user identifier, the system account, the requested asset, and the requested action; and
  - authorizing the user's entitlement to access the requested asset and perform the requested action with the system account substantially at a time of requested access.

16. The method of claim 15, further comprising:
- performing a step-up validation against a regulation, policy, or law.

17. The method of claim 15, wherein the in-memory entitlements graph is based on linking common information from human resources data, entitlement data, and policy data.

18. The method of claim 15, further comprising:
- establishing a session with the requested asset; and
- logging user actions during the session.

19. The method of claim 15, wherein the requested asset comprises a database instance, an application instance, a business flow or a data object.

20. The method of claim 15, wherein the user's entitlement to access the requested asset and perform the requested action with the system account substantially at the time of requested access is authorized with the in-memory entitlement graph.

* * * * *